Nov. 2, 1943.   W. E. DUERINGER   2,333,083
TELEMETRIC SYSTEMS
Original Filed May 28, 1937    5 Sheets-Sheet 1

INVENTOR
WALTER E. DUERINGER
BY Raymond W. Junkins
ATTORNEY

Nov. 2, 1943.  W. E. DUERINGER  2,333,083
TELEMETRIC SYSTEMS
Original Filed May 28, 1937   5 Sheets-Sheet 2

INVENTOR
WALTER E. DUERINGER
BY
Raymond W. Junkins
ATTORNEY

Nov. 2, 1943.  W. E. DUERINGER  2,333,083
TELEMETRIC SYSTEMS
Original Filed May 28, 1937  5 Sheets-Sheet 3

INVENTOR
WALTER E. DUERINGER
BY
Raymond W. Junkins
ATTORNEY

Nov. 2, 1943.                    W. E. DUERINGER                    2,333,083
                                 TELEMETRIC SYSTEMS
                       Original Filed May 28, 1937     5 Sheets-Sheet 4

INVENTOR
WALTER E. DUERINGER
BY
Raymond D. Junkins
ATTORNEY

Nov. 2, 1943.  W. E. DUERINGER  2,333,083
TELEMETRIC SYSTEMS
Original Filed May 28, 1937  5 Sheets-Sheet 5

Inventor
WALTER E. DUERINGER
By Raymond W. Jenkins
Attorney

Patented Nov. 2, 1943

2,333,083

UNITED STATES PATENT OFFICE 2,333,083

TELEMETRIC SYSTEM

Walter E. Dueringer, Shaker Heights, Ohio, assignor to Bailey Meter Company, a corporation of Delaware Original application May 28, 1937, Serial No. 145,284. Divided and this application October 30, 1940, Serial No. 363,536

10 Claims. (Cl. 74—1)

This invention relates to telemetric systems for remotely indicating or otherwise exhibiting the position of a movable transmitting member.

One object of my invention is to provide a system wherein the position of a delicate sensitive member, such as a Bourdon tube or galvanometer, may be remotely indicated or otherwise exhibited.

A further object is to provide a telemetric system wherein the sum or difference of a plurality of indications may be determined and exhibited at a remote station.

Still another object is to provide a telemetric system wherein the position of a movable transmitting member may be exhibited at a plurality of remote receiving stations.

It is a further object to provide a telemetric system wherein the indication at the receiving station is unaffected by changes in conditions otherwise affecting the accuracy with which the transmitting member is positioned.

Further objects will be apparent from the description and from the drawings in which.

Figure 1:
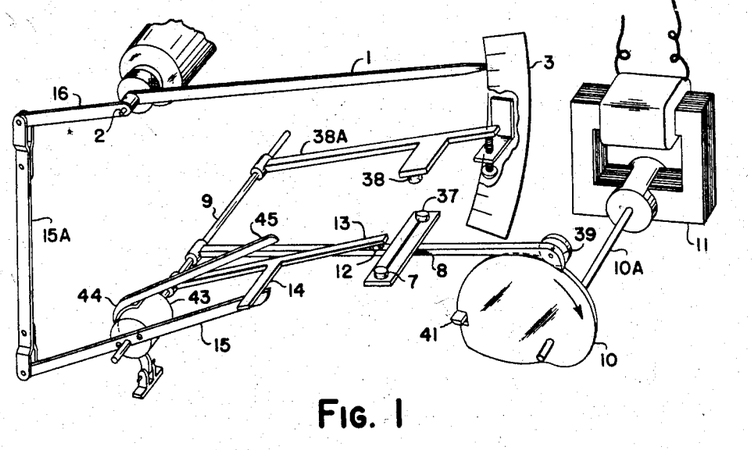
Fig. 1 illustrates a transmitting station embodying my invention.

Referring to the drawings, Fig. 1 represents a transmitting station within which is a pointer or indicator 1 angularly positionable about a spindle 2, and the position of which relative to a scale 3 it is desired to remotely indicate, record or otherwise exhibit. The spindle 2 to which the indicator 1 is secured may be positioned, for example, by a Bourdon tube responsive to pressure or temperature, a meter of the rate of flow of a fluid, a galvanometer responsive to an electromotive force; or by any other device positioned by and in accordance with the magnitude of a variable. The spindle 2 may, in some cases, be positioned manually, so that the pointer 1, positioned to different points on the scale 3, indicates various orders, commands, or other information it is desired to transmit to a remotely located station.

Figure 2:
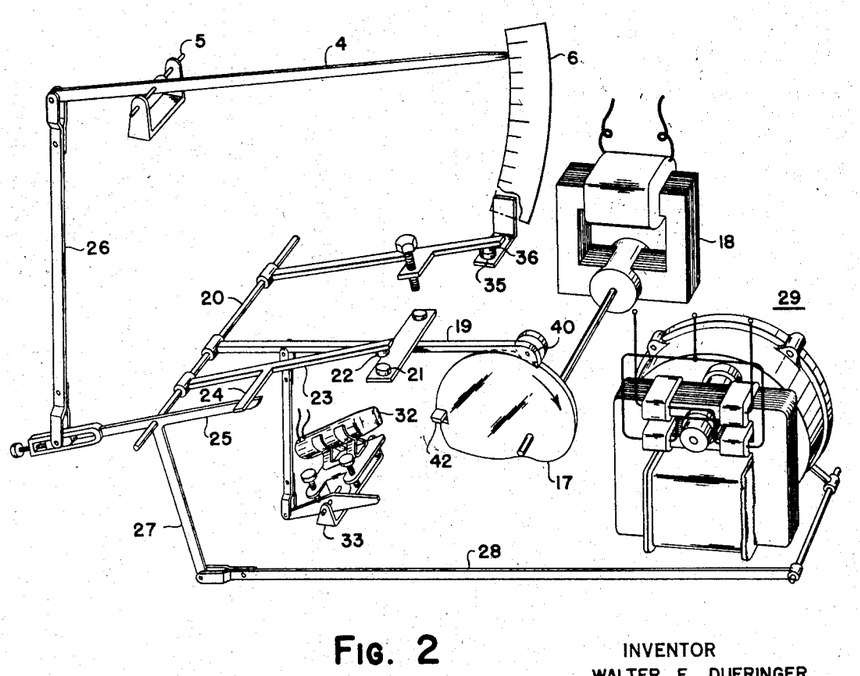
Fig. 2 illustrates a receiving station used with the transmitting station shown in Fig. 1.

Fig. 2 represents a receiving station and is provided with an index 4 positionable about a shaft 5. Cooperating with the index 4 is a scale 6 which may be graduated identically with scale 3. In general, it is the purpose of the apparatus shown in Figs. 1 and 2 to position the index 4 in accordance with changes in position of the transmitting index 1, so that an observer stationed at the receiving station shown in Fig. 2, will be immediately advised of the position of the transmitting index 1.

The mechanism shown in Fig. 1 acts to periodically originate electrical impulses of a time length proportional to, or in relation to, the position of, or change in position of, the transmitting index 1. Likewise the mechanism shown in Fig. 2 acts to periodically originate electrical impulses of a time length proportional to, or in relation to, the position of, or change in position of, the receiving index 4. If these electrical impulses originating in the transmitting and receiving mechanisms are of the same time length it indicates that the position of the receiving index 4 agrees with that of the transmitting index 1. If, however, the impulses originating in the transmitting mechanism are of either shorter or longer duration than those originating in the receiver, it indicates that the receiving index 4 is not in agreement with the transmitting index 1. Accordingly, incorporated in the receiving mechanism are means for positioning the receiving index 4 an amount proportional to the difference in time lengths of the impulses and in a sense to restore correspondence between the transmitting and receiving indices.

In the transmitting mechanism shown in Fig. 1 these electric impulses are originated through the agency of a contact 7 carried by a member 8, one end of which is pivotally supported by a shaft 9 and the other end of which is periodically reciprocated by a cam 10 mounted on shaft 10A and continuously rotated by means of a synchronous motor 11. Engaged by the contact 7 during each cycle of operation is a contact 12 carried by a pick-up member 13, pivotally supported on the shaft 9. The member 13 has an extension 14 normally resting by gravity on an arm 15 positionable about the shaft 9 by an extension 16 of the transmitting index 1 through a link 15A. When the transmitting index 1 is positioned upwardly, for example, the arm 15 is positioned about the shaft 9 in a counterclockwise direction a proportionate amount, carrying with it the member 13. Likewise when the transmitting index 1 is positioned downwardly the arm 15 is positioned in a clockwise direction a proportionate amount, carrying with it the member 13. The increment of time during each cycle of operation in which contacts 7, 12 are engaged is therefore dependent upon the position of the arm 15.

In the receiving station is a cam 17 continuously rotated in phase with the transmitting cam 10 by a synchronous motor 18 and serving to periodically reciprocate a member 19 about a shaft 20. The member 19 carries a contact 21 arranged to engage a cooperating contact 22 carried by a pick-up member 23 pivotally mounted on the shaft 20. The member 23 is provided with an extension 24 normally resting by gravity on a lever 25 positionable about the shaft 20 and connected to the receiving index 4 through a link 26. The arm 25 has an extension 27 connected by a link 28 to a reversible motor 29 having opposed windings. Movement of the motor 29 in a clockwise direction effects a downward positioning of the receiving index and a corresponding positioning of the member 23. Conversely counter-clockwise positioning of the motor effects an upward positioning of the receiving index 4 and member 23.

If the position of the receiving index 4 corresponds to that of the transmitting index 1, then in operation, the contact 21 will periodically engage the contact 22 at the same instant that the contact 7 engages the contact 12. When the transmitting index 1 is positioned upwardly however, the contact 7 will engage the contact 12 after the contact 21 has engaged the contact 22 by a time lengh proportional to the upward movement of the transmitting index 1. Conversely if the transmitting index 1 is positioned in a downward direction then the contact 7 will engage the contact 12 before the contact 21 engages the contact 22 by a length of time proportional to the downward movement of the transmitting index 1.

Figure 3:
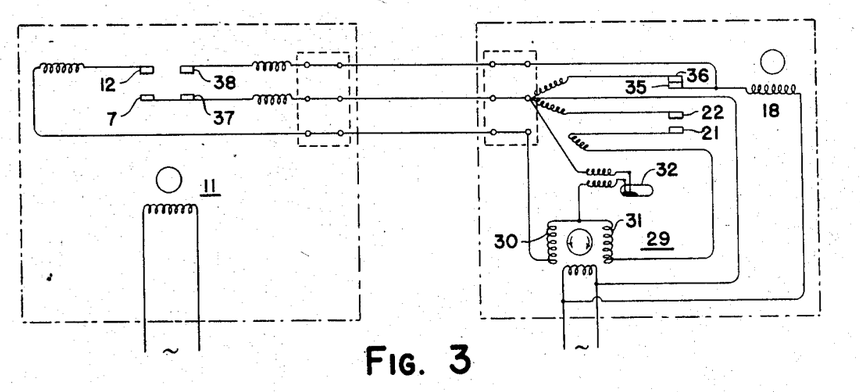
Fig. 3 is a wiring diagram of the electrical connections used with the apparatus shown in Figs. 1 and 2.

Referring now to Fig. 3 I have shown the electrical connections within and between the receiving and transmitting stations. The contacts 7, 12 act, upon engagement, to short circuit a winding 30 of the reversible motor 29. The contacts 21, 22, upon engagement, act to short circuit the opposed winding 31 of the motor. With the winding 30 short circuited the motor 29 rotates in one direction, with the winding 31 short circuited the motor rotates in opposite direction. With both windings either energized or deenergized the motor is not urged to rotation in either direction. It is apparent that upon the contact 7 engaging the contact 12 simultaneously with the engagement of contacts 21 and 22 the motor 29 will remain stationary. However, if the contacts 7, 12 engage prior to engagement of contacts 21, 22 the motor will rotate in one direction, and if contacts 21, 22 engage prior to contacts 7, 12 the motor will rotate in opposite direction until the lagging pair of contacts engage. Rotation of the motor 29 as hereinbefore explained serves to position the contact 22 and the receiving index 4. Simultaneous engagement of contacts 7, 12 and 21, 22 indicates that the position of the receiving index 4 is in correspondence with that of the transmitting index.

Connected in the neutral of the motor 29 is a mercury switch 32 pivotally supported on a bracket 33 and arranged to be rocked from a closed to an open position when a predetermined point on the rising section of cam 17 is engaged by member 19. Upon the member 19 engaging substantially the lowermost point of cam 17, the switch 32 is thrown to closed position. When as shown in Fig. 2 the member 19 is engaging the rising section of cam 17 the mercury switch 32 is closed so that engagement of contacts 21, 22 and/or contacts 7, 12 serves to short circuit the windings of the motor 29. Upon the member 19 being raised to a predetermined position by the cam 17 the mercury switch 32 will be tilted to open position, thereby open circuiting the windings 29 and 30 notwithstanding that the contacts 21, 22 and 7, 12 remain engaged. After member 19 has passed below the lowermost position in the range of operation of the member 23, thereby obviating the possibility of contacts 7 and 21 being engaged with their cooperating contacts 12 and 22 respectively, mercury switch 32 is thrown to closed position.

In normal operation cam 17 is in exact phase with the cam 10. That is the point on the contour of cam 17 engaged by the member 19 agrees precisely with the point on the contour of cam 10 engaged by member 8. Under these conditions it is apparent that if indices 1 and 4 are in proper correspondence contacts 21, 22 and 7, 12 will engage at the same instant. If index 1 moves downwardly, for example, then upon the next cycle of operation the contacts 7 and 12 will engage prior to contacts 21, 22 causing the motor 29 to operate for the increment of time prior to engagement of contacts 21, 22 in a direction to position the index 4 downwardly. If the change in position of the index 4 is sufficient to again bring it into correspondence with the index 1, upon the next cycle of operation the contacts 21, 22 and 7, 12 will engage simultaneously. If, however, the correction has not been sufficient to reestablish correspondence, then the contacts 7, 12 will again engage before contacts 21, 22 but by a smaller increment of time. Each cycle of operation will, if necessary, produce a similar incremental positioning of the index 4 until it is brought into proper correspondence with index 1. Upward movement of the index 1 produces converse action, the contacts 21, 22 then engaging prior to the contacts 7, 12, actuating the motor 29 in a direction to position the index 4 upwardly until it is again brought into proper correspondence with the transmitting index 1.

While under normal operating conditions the cams 10 and 17 will remain in proper phase relationship indefinitely, to insure such phase relationship being continuously maintained, the position of the cam 17 is compared to that of the cam 10 each revolution, and if it is out of phase therewith proper phase relationship is restored by stopping motor 18. Energization of the motor 18 is controlled through normally closed contacts 35, 36 and normally open contacts 37, 38 connected in parallel. The members 8 and 19 are provided with similar overhanging sections 39 and 40 respectively. When section 39 engages lateral projection 41 on cam 10, contact 37 engages contact 38. When the corresponding section 40 of member 19 engages lateral projection 42 of cam 17, contact 36 disengages contact 35. Upon section 39 leaving projection 41 contacts 37, 38 disengage and upon section 40 leaving projection 42 contacts 35, 36 reengage. If cam 17 is in proper phase relationship with cam 10 contacts 37, 38 will engage at the instant contacts 35, 36 disengage; and disengagement of contacts 37, 38 and reengagement of contacts 35, 36 will also occur simultaneously, thereby effecting continuous energization of the motor 18. If cam 17 is out of phase with cam 10 then such coordinated action between contacts 35, 36 and 37, 38 will not occur resulting in the motor 18 being deenergized periodically or continuously until proper phase relationship is again restored.

Telemetric systems such as I have disclosed in Figs. 1, 2 and 3 I use to remotely indicate or otherwise exhibit the magnitude of a condition, such as pressure, temperature, or electromotive force. Devices sensitive to such conditions are inherently delicate, and in order that they may accurately be positioned in accordance with the magnitude of the condition being measured it is necessary that the transmitting mechanism does not in any way react upon them. To avoid the possibility of such reaction destroying the accuracy with which the transmitting index 1 is positioned, I show in Fig. 1 a preferred form of locking means whereby the arm 15 is locked in position while being engaged or disengaged by the extention 14. Accordingly, any reaction or shock which might otherwise be present, due to the periodic lifting and falling of the member 13, is eliminated.

Referring to Fig. 1, there is secured to the arm 15 a brake drum 43. Cooperating therewith is a brake band or shoe 44, normally held in engagement with the drum by the weight of an overhanging arm 45. During each cycle of operation after the member 13 has been lifted from the arm 15 the extension 14 engages the arm 45 and releases the brake band 44, so that the arm 15 is free to be positioned by the sensitive device moving the spindle 2. Preferably the brake band 44 is released only after the member 8 has been moved beyond the limits within which the member 13 is positioned by the sensitive device. Upon the member 8 descending, the brake band 44 is again brought into engagement with the drum 43 before the extension 14 engages the arm 15. Accordingly, any slight shock which might otherwise be transmitted to the spindle 2 through engagement of the extension 14 with the arm 15 is avoided.

Figure 4:
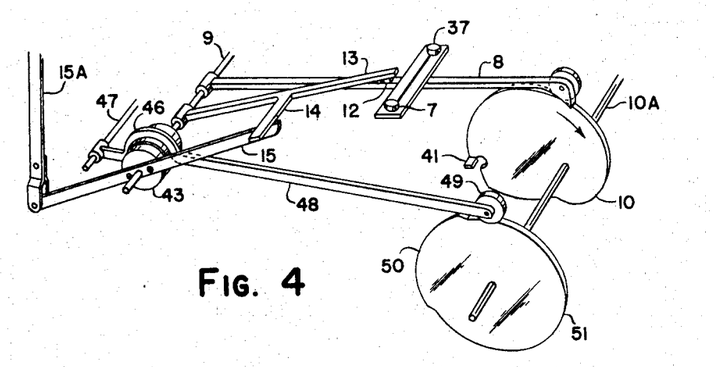
Figs. 4 and 5 are modified forms of my invention as shown in Fig. 1.

In Fig. 4 I show a modified form of brake mechanism wherein the drum 43 is normally engaged by a brake shoe 46 having one end pivotally mounted on a stationary shaft 47 and provided with a substantially horizontal arm 48 which normally serves through its weight to hold the band 46 in engagement with the drum 43. Axially mounted on the arm 48 is a cam follower 49 adapted to be lifted by raised section 50 of a cam 51 and disengage the shoe 46 from the drum 43. The cam 51 is mounted on the shaft 10A and rotates in unison with the cam 10. Preferably the raised section 50 is arranged so that the shoe 46 is disengaged from the drum 43 only when the member 13 is beyond the travel limit of the arm 15. However, as will be apparent to those skilled in the art, the raised section 50 may be proportioned to give any desired relation between the periods of time when the drum 43 is engaged and disengaged by the shoe 46.

Figure 5:
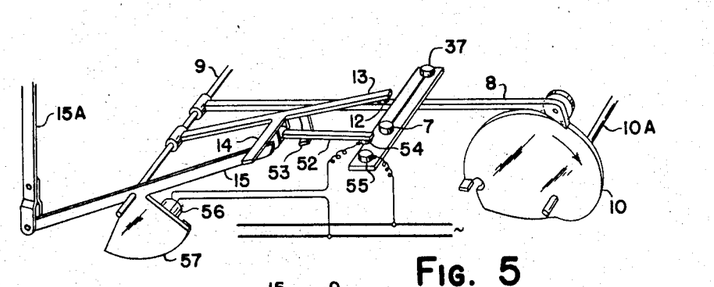
Figure 6:
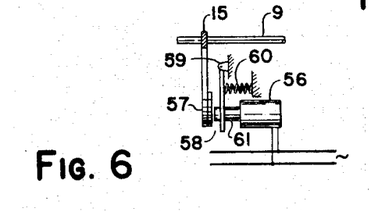
Fig. 6 is a detailed view of part of the mechanism shown in Fig. 5.

In Figs. 5 and 6 I show a further modified form of locking mechanism wherein the member 15 is periodically held in position by electromagnetic means. Pivotally supported by the extension 14 is a contact arm 52 normally resting against a bracket 53 carried by the member 13. The arm 52 carries a contact 54 adapted to engage a contact 55 carried by the member 8. Engagement of the contact 55 with the contact 54 energizes a solenoid 56.

The arm 15 is provided with a brake sector 57. As shown in Fig. 6, the brake sector 57 is adapted to be engaged by a brake shoe 58 pivotally supported at 59. Normally the shoe 58 is held out of engagement with the sector 57 by a tension spring 60. Upon energization of the solenoid 56, however, the shoe 58 is brought into engagement with the sector 57 by a plunger 61 urged to the left, as viewed in the drawings.

As will be apparent from Fig. 5, contacts 54 and 55 engage during a predetermined increment of time prior to the engagement of contacts 7 and 12. Likewise they are disengaged after contacts 7 and 12 have disengaged. Accordingly, the arm 15 will be free to be positioned by the responsive device excepting for a period of time overlapping the increment of time when the contacts 7 and 12 are in engagement.

Figure 7:
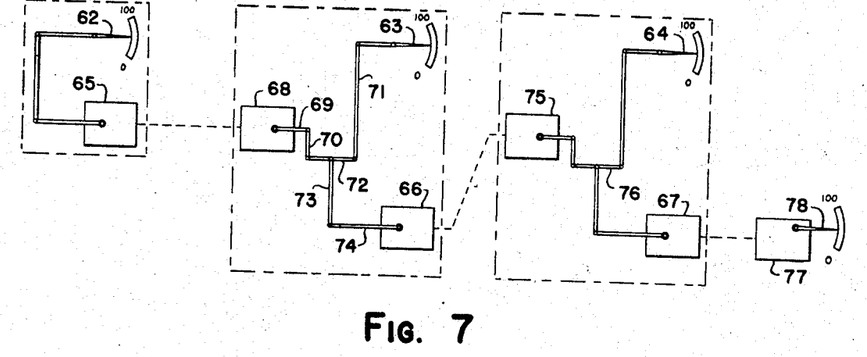
Fig. 7 illustrates my invention employed to totalize a plurality of indications.
Figures 8, 9:
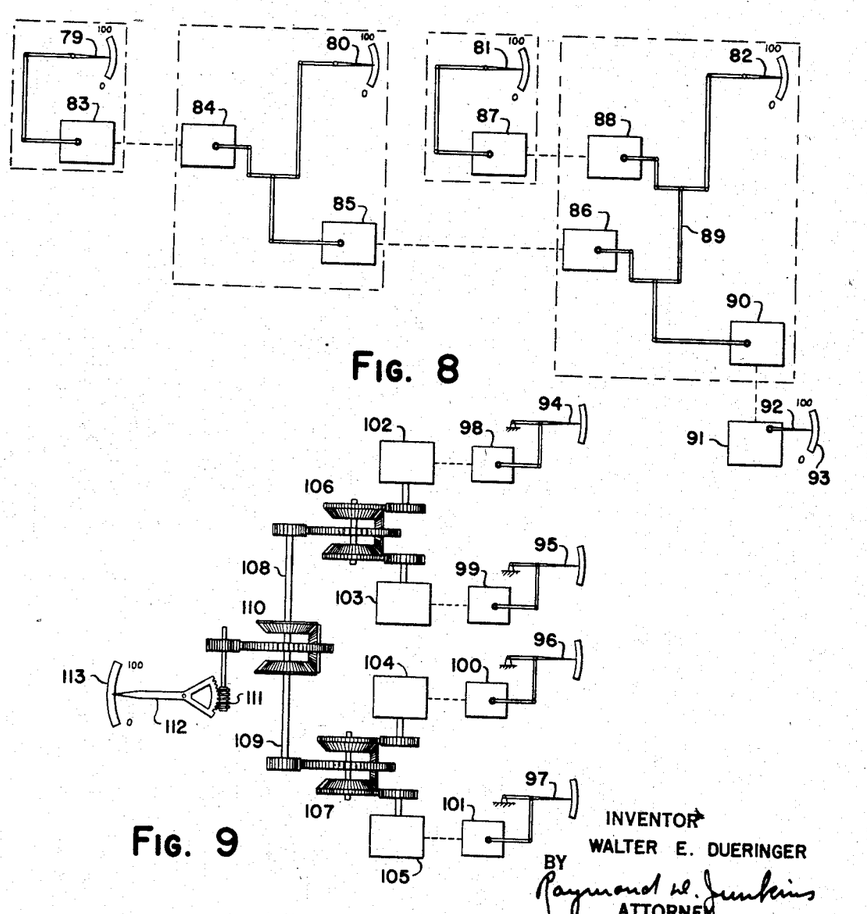
Figs. 8 and 9 are modified forms of my invention as shown in Fig. 7.

It is frequently desirable to remotely indicate the total of difference of a plurality of variables. Particularly in the measurement of the rate of flow of fluids, such as steam, water, or gas, it is desirable to know the total flow through a plurality of lines. In Figs. 7, 8 and 9 I have disclosed alternate arrangements of my invention adapted to remotely give the sum of a plurality of variables. Referring to Fig. 7, I therein show transmitting indices 62, 63 and 64, each arranged to be positioned relative to a scale and each responsive to a variable such as the rate of flow of a fluid through a conduit. Actuated by the transmitting indices 62, 63 and 64 are transmitting devices, such as shown in Fig. 1, diagrammatically illustrated at 65, 66 and 67 respectively. The transmitting device 65 serves to position a receiving device, such as shown in Fig. 2, diagrammatically illustrated at 68. The receiving device 68 is provided with an arm 69, corresponding to the index 4 shown in Fig. 2, and positioned in consonance with the positioning of the transmitting index 62. Depending from the arm 69 is a pivoted link 70 and depending from the transmitting index 63 is a similar arm 71. Links 70 and 71 are pivotally connected to a horizontal differential beam 72, from the midpoint of which depends a pivoted member 73, serving to actuate an arm 74, corresponding to the transmitting index 1 shown in Fig. 1, and controlling the transmitting device 66.

The transmitting device 66 is therefore positioned jointly by the transmitting index 63 and arm 69, so that it originates electrical impulses proportional to the sum of the positions or changes in position of the transmitting index 63 and arm 69.

The transmitting device 66 in turn serves to position a receiving device 75 differentially linked by means of a member 76 to the transmitting index 64, and the two serving to jointly position the transmitting mechanism 67. The transmitting mechanism 67 accordingly originates impulses proportional in time length to the sum of the positions or changes in position of the transmitting indices 62, 63 and 64. Such impulses are transmitted to a final receiving mechanism 77 having an index 78, which is positioned in accordance with the sum of the positions of the transmitting indices 62, 63 and 64. An observer, therefore, stationed at the receiving mechanism 77 may, by observing the position of the final receiving index 78, be advised of the total of the variables which the indices 62, 63 and 64 are positioned in accordance with.

In Fig. 8 I show a modified arrangement adapted to remotely indicate or otherwise exhibit the sum of four variables. Therein I show transmitting indices 79, 80, 81 and 82, each positioned in accordance with the magnitude of a variable. The index 79 is arranged to position a transmitting mechanism 83, which in turn controls a receiving mechanism 84. The transmitting index 80 and receiving mechanism 84 jointly position, through a differential linkage, a transmitting mechanism 85, in turn positioning a receiving mechanism 86.

The transmitting index 81 is arranged to position a transmitting mechanism 87, controlling a receiving mechanism 88. The transmitting index 82 and receiving mechanism 88 jointly position a link 89 which, with the receiving mechanism 86, positions a transmitting mechanism 90, which in turn controls a final receiving mechanism 91. The receiving mechanism 91 may be provided with a final receiving index 92 which will be positioned relative to a scale 93 in accordance with the sum of the positions of the transmitting indices 79, 80, 81 and 82.

In Fig. 9 I show an alternate arrangement wherein transmitting indices 94, 95, 96 and 97 actuate transmitting devices 98, 99, 100 and 101 respectively. Positioned by the transmitting mechanisms are receiving devices 102, 103, 104 and 105 respectively, which may be remotely located from the transmitters.

Receiving devices 102 and 103 jointly serve to position a differential gear mechanism diagrammatically indicated at 106. Likewise receiving devices 104 and 105 serve to actuate a differential gear mechanism 107. Differential gear mechanism 106 positions a shaft 108 and differential gear 107 positions a shaft 109, which together serve to actuate a differential gear mechanism 110. Operated by the differential gear mechanism 110 is a worm 111 positioning an index 112 relative to a scale 113. The index 112 will be positioned proportional to the sum of the positionings of the transmitting indices 94, 95, 96 and 97.

Figures 10, 11:
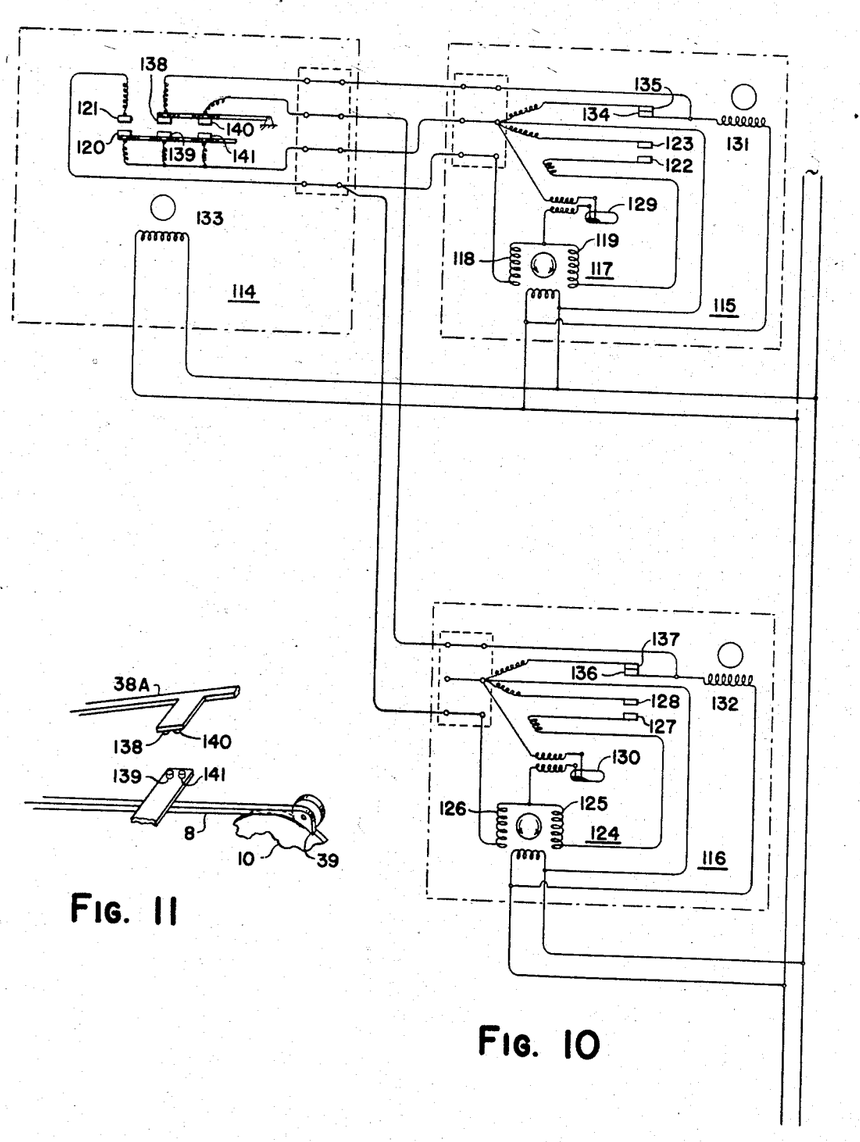
Fig. 10 is a schematic wiring diagram illustrating the invention used to exhibit the position of a movable transmitting member at a plurality of remote receiving stations.
Fig. 11 is a fragmentary view illustrating a modified form of the apparatus shown in Fig. 1 used with the modification of my invention embodied in Fig. 10.

In Fig. 10 I show diagrammatically an arrangement whereby a single transmitting mechanism may be used to position a plurality of receiving mechanisms. Therein I show a transmitting mechanism generally indicated at 114 arranged to position a receiving mechanism 115 and a second receiving mechanism 116. Located within the receiving mechanism 115 is a reversible motor 117, similar to motor 29 and having opposed windings 118 and 119. Winding 118 is controlled by contacts 120 and 121, corresponding to contacts 7 and 12 shown in Fig. 1. Periodically contact 120 engages contact 121 and serves to short circuit winding 118. Winding 117 is controlled by contacts 122 and 123 located in the receiving mechanism 115 and corresponding to contacts 21 and 22 shown in Fig. 2. If contacts 120, 121 and 122, 123 engage simultaneously, motor 117 is not urged to rotation in either direction. If contacts 120, 121 engage before contacts 122, 123 motor 117 rotates in one direction, and conversely if contacts 120, 121 engage after contacts 122, 123 motor 117 rotates in the opposite direction.

Within the receiving mechanism 116 is a reversible motor 124 similar to motor 29 and having opposed windings 125 and 126. Winding 126 is controlled by contacts 120, 121 simultaneously with winding 118 of motor 117. Winding 125 is controlled by contacts 127, 128 located in the receiving mechanism 116 and corresponding to contacts 21, 22 shown in Fig. 2. Accordingly, so long as contacts 127, 128 engage simultaneously with contacts 120, 121 the motor 124 is not urged to rotation. Engagement of contacts 120, 121 subsequent to or prior to engagement of contacts 127, 128 serve to produce rotation of the motor 124 in one direction or another to restore simultaneous engagement of the transmitting contacts 120, 121 and receiving contacts 127, 128.

It is, of course, understood that at the transmitting station 114 a mechanism similar to that shown in Fig. 1 would be located and serve to actuate contacts 120, 121. In each of the receiving stations 115, 116 a receiving mechanism similar to that shown in Fig. 2 would be located and serve to position the contacts 122, 123 and 127, 128 respectively. In each of the receiving mechanisms 115, 116 is located a mercury switch 129 and 130 respectively. To open the neutral of the motors 117 and 124 when contacts 122 and 127 attain predetermined positions and similarly to close the neutrals upon said contacts attaining second predetermined positions.

In order that motors 131 and 132 located in receiving stations 115 and 116 respectively and corresponding to motor 18 shown in Fig. 2, may be maintained in proper phase relationship with motor 133 located in transmitting station 114 and corresponding to motor 11 shown in Fig. 1, I provide means as shown in Fig. 1 for checking the phase relationship between said motors each cycle of operation. Located within receiving station 115 are normally engaged contacts 134 and 135, and in receiving station 116 similar contacts 136 and 137. Connected in parallel with contacts 134, 135 are contacts 138 and 139 located in the transmitting mechanism 114. If the motor 131 is in proper phase relationship with motor 133 the instant contacts 134, 135 become disengaged contacts 138, 139 engage and the instant contacts 138, 139 disengage contacts 134, 135 reengage. Accordingly, under normal operation motor 131 is continuously energized. If, however, proper phase relationship between motor 131 and 133 is destroyed, then the usual coordination between the operation of contacts 134, 135 and 138, 139 will not occur and the position of motor 131 is corrected until the proper phase relationship is restored.

Operated in unison with contacts 138, 139 are contacts 140, 141, connected in parallel with contacts 136, 137 located in the receiving station 116. These contacts serve to control the operation of motor 132 to maintain it in proper phase relationship with motor 133. In Fig. 11 I show how the transmitting mechanism shown in Fig. 1 may be modified to include contacts 140, 141. Therein the member 8 carries contacts 139, 141 arranged to engage contacts 138, 140 carried by the member 38A. Once each revolution of the cam 10 when the extension 33 engages the lip 41 contacts 138, 139 and 140, 141 will engage.

Devices for determining the magnitude of some particular variables are affected by conditions pertinent to that variable and my invention further contemplates correcting the position of the responsive device so that the arm 15 and accordingly the receiving index 4 are moved in exact accordance with changes in the variable and errors which would otherwise be present are eliminated. For example, in a meter for determining the rate of flow of fluid through a conduit, the pressure differential produced by an orifice and by which the meter is positioned is affected by changes in pressure and temperature of the fluid being measured. Specifically:

$$W = K\sqrt{\frac{h}{V}}$$

Where:
W=rate of flow of fluid in pounds per hour.
K=a constant.
h=differential head in inches of water.
V=specific volume in cubic feet per lb.

It is apparent that variations in any condition affecting the specific volume of the fluid will affect the accuracy with which the responsive device is positioned. For compressible vapors and gases such conditions are usually pressure and temperature, for non-compressible fluids, such as water, variations in temperature usually produce the greater error. Where my telemetric system is used to remotely indicate the magnitude of such variables I provide means for modifying the positioning of the arm 15 in accordance with changes in the magnitude of the condition or conditions.

Figure 12:
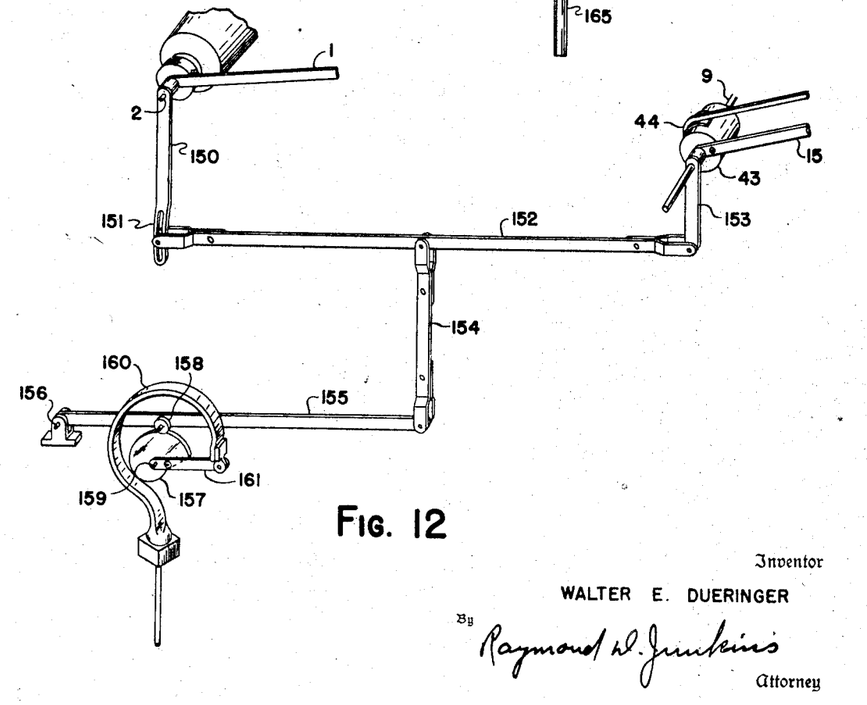
Figs. 12 and 13 are fragmentary views of modified forms of Fig. 1 incorporating means for correcting for changes in conditions otherwise affecting the accuracy with which the transmitting member is positioned.

Referring to Fig. 12, fastened to the spindle 2 is a drive arm 150 in which is an arcuate slot 151. Positionable in the slot 151 is one end of a horizontal beam 152, the other end of which is pivotally connected to a link 153 secured to and positioning the arm 15. Depending from the beam 152 is a pivoted member 154, the lower end of which is connected to a lever 155 positionable about a fixed pivot 156 by a cam 157 engaging a follower 158 rotatably mounted on the lever.

The cam 157 is movable about a fixed pivot 159 by a Bourdon tube 160 through a link 161. The Bourdon tube 160 may be responsive to pressure or temperature affecting the positioning of the spindle 2 by the variable which it is desired to remotely indicate. It should be understood, however, that the Bourdon tube 160 is merely one example of any number of devices which may be used to modify the positioning of the arm 15 by spindle 2.

In operation, assuming that the Bourdon tube 160 remains in fixed position, then movements of the spindle 2 are transmitted to the arm 15 through members 150, 152 and 153. Assume now that the Bourdon tube 160 is deflected in a counterclockwise direction a predetermined amount, then the lever 155 will rise a predetermined amount depending upon the contour of the cam 157. Member 152 will accordingly be positioned upwardly in the slot 151 and thereafter a given angular motion of the spindle 2 will produce a smaller amount of angular positioning of arm 15 than it did previously. Conversely, if the free end of the Bourdon tube 160 is positioned in a clockwise direction then beam 152 will be positioned downwardly, thereby increasing the resultant motion of arm 15 for a given motion of spindle 2. It is apparent that by proper shaping of the cam 157 any desired relation may be obtained between changes in the magnitude of the condition positioning the Bourdon tube 160 and resultant changes in the ratio between movements of the spindle 2 and arm 15.

Figure 13:
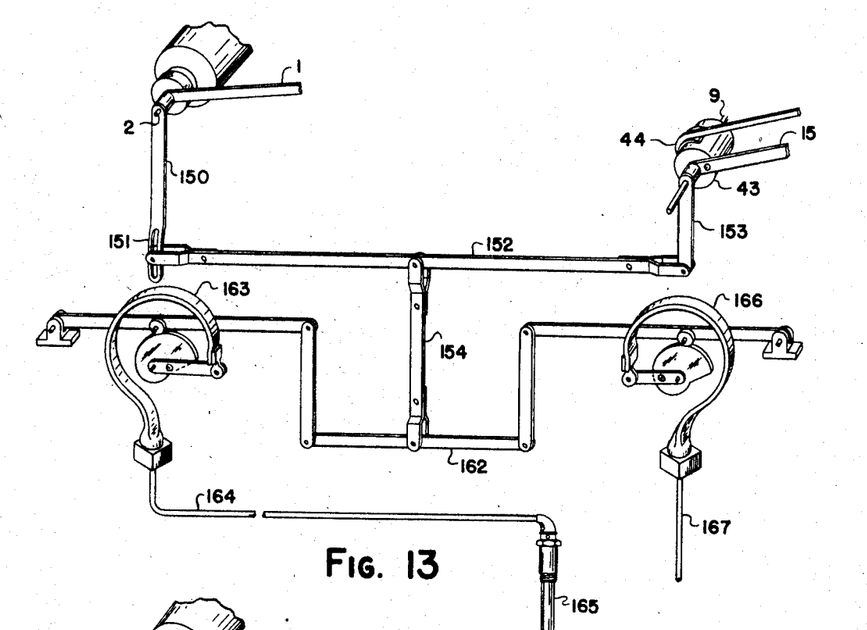

Referring to Fig. 13 I show a modification wherein the ratio between angular movements of the spindle 2 and arm 15 is varied in accordance with changes in magnitude of two conditions. In the measurement of the rate of flow of steam, for example, the differential head produced by an orifice or other primary element varies inversely as the specific volume. Inasmuch as the spindle 2 is angularly positioned in accordance with the differential head, if the remote index 4 is to be positioned in exact accordance with the rate of flow, it is necessary that the movements imparted to the arm 15 by the spindle 2 be modified both in accordance with changes in temperature and changes in pressure, inasmuch as changes in both of these conditions affect the specific volume.

In Fig. 13 the link 154 is shown pivotally connected to a differential beam 162, one end of which is positioned by a Bourdon tube 163 connected by the capillary 164 to a temperature sensitive bulb 165. As will be understood by those familiar with the art, the bulb 165 is installed in the conduit through which the fluid, the rate of flow of which it is desired to determine, is flowing. The Bourdon tube 163 will thereafter be positioned in accordance with changes in temperature of the fluid surrounding the bulb 165.

The opposite end of the differential beam 162 is positioned by a Bourdon tube 166 connected by a tube 167 to the conduit (not shown). Inasmuch as the specific volume of steam varies directly with increases in temperature and inversely with increases in pressure, the Bourdon tube 163 sensitive to temperature is arranged to position the beam 162 upwardly in the slot 151 as the temperature of the steam increases. Likewise the Bourdon tube 166 sensitive to pressure is shown arranged to position the beam 152 downwardly in the slot 151 upon increases in pressure.

It is to be understood, of course, that I have used the measurement of the rate of flow of steam merely as an example and that the apparatus shown in Fig. 13 may be put to a wide variety of uses. In general, it may be used to multiply or divide the angular motion of the spindle 2 imparted to the arm 15 in accordance with changes in one or more conditions regardless of what those conditions might be.

Having thus described my invention and preferred embodiments thereof, I desire it to be understood that I am not to be limited thereby except as to the claims in view of the prior art.

This application constitutes a division of my copending parent application Serial No. 145,284, filed in the United States Patent Office May 28, 1937.

What I claim as new and desire to secure by Letters Patent of the United States is:

1. In a telemetric system, in combination, a member positioned in accordance with the magnitude of a variable, cyclically operable means for periodically determining the position of said member, and additional means locking said first named member in position during a predetermined portion of each cycle of operation.

2. In a telemetric system, in combination, a first member angularly positionable about a center, a second member positionable about said center and normally in engagement with the first member, cyclically operable means for periodically moving the second member from engagement with the first member to a predetermined position and returning it to said normal position, and additional means for locking said first member against movement while the second member is in engagement therewith.

3. In a telemetric system, in combination, a first member angularly positionable about a center, a second member positionable about said center and normally in engagement with the first member, cyclically operable means for periodically moving the second member from engagement with the first member to a predetermined position and returning it to said normal position, and brake means locking said first member against movement operated by the second member at predetermined points in its movement by said cyclically operable means.

4. In a telemetric system, in combination, an axle, a first member angularly positionable about said axle, a second member positionable about said axle and normally in engagement with the first member, cyclically operable means for periodically moving the second member from engagement with the first member to a predetermined position and returning it to said normal position, a brake drum secured to first member and rotatable about said axle, a cooperating brake band arranged to engage said drum, an arm secured to said band for normally maintaining said band in engagement with said drum, and a projection on the second member for engaging said arm to release said band from engagement with the drum.

5. In a telemetric system, in combination, an axle, a first member angularly positionable about said axle, a second member positionable about said axle and normally in engagement with the first member, cyclically operable means for periodically moving the second member from engagement with the first member to a predetermined position and returning it to said normal position, a brake drum secured to said first member and rotatable about said axle, a cooperating brake band arranged to engage said drum, an arm secured to said band for normally maintaining said band in engagement with said drum, and a second cyclically operable means for periodically moving said arm to release said band from engagement with the drum for predetermined increments of time.

6. In a telemetric system, in combination, a first member angularly positionable about a center, a second member positionable about said center and normally in engagement with the first member, cyclically operable means for periodically moving the second member from engagement with the first member to a predetermined position and returning it to said normal position, and cyclically operable brake means for periodically locking said first member against rotation for predetermined increments of time.

7. In a telemetric system, in combination, an axle, a first member angularly positionable about said axle within predetermined travel limits, a second member positionable about said axle and normally in engagement with the first member, a rotatable cam for periodically moving the second member from engagement with the first member to a predetermined position beyond said travel limits and returning it to said normal position, a brake drum secured to said first member and rotatable about said axle, a cooperating brake band arranged to normally engage said drum, and a second cam operated in unison with the first named cam for releasing said brake band while said second member is beyond the travel limits of said first member.

8. In a telemetric system, in combination, a member positioned in accordance with the magnitude of a variable, cyclically operable means for periodically determining the position of said member, an electromagnetic retarding means for locking said first member in position during a predetermined portion of each cycle of operation.

9. In a telemetric system, in combination, a first member angularly positionable about a center, a second member positionable about said center and normally in engagement with the first member, cyclically operable means for periodically moving the second member from engagement with the first member to a predetermined position and returning it to said normal position, and electromagnetic brake means under the control of said cyclically operable means for locking said first member in position during a predetermined portion of each increment of time.

10. In a telemetric system, in combination, an axle, a first member angularly positionable about said axle, a second member positionable about said axle and normally in engagement with the first member, a rotatable cam for periodically moving the second member from engagement with the first member to a predetermined position and returning said second member to engagement with the first member, an electromagnetic means under the joint control of the second member and the cyclically operable means for locking the first member against movement while the second member is being engaged or disengaged from the said first member.

WALTER E. DUERINGER.